(12) United States Patent
Hazel et al.

(10) Patent No.: US 7,247,393 B2
(45) Date of Patent: Jul. 24, 2007

(54) GAMMA PRIME PHASE-CONTAINING NICKEL ALUMINIDE COATING

(75) Inventors: Brian Thomas Hazel, West Chester, OH (US); Ramgopal Darolia, West Chester, OH (US); Brett Allen Rohrer Boutwell, Liberty Township, OH (US); David John Wortman, Hamilton, OH (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 11/162,839

(22) Filed: Sep. 26, 2005

(65) Prior Publication Data

US 2007/0071996 A1    Mar. 29, 2007

(51) Int. Cl.
*B32B 15/01* (2006.01)
*B32B 15/04* (2006.01)
*B32B 15/20* (2006.01)
*F01D 5/28* (2006.01)

(52) U.S. Cl. .................. 428/680; 428/610; 428/650; 428/670; 416/241 R

(58) Field of Classification Search ............... 428/650, 428/652, 670, 680, 679, 610; 416/241 R
See application file for complete search history.

(56) References Cited

U.S. PATENT DOCUMENTS

| | | | |
|---|---|---|---|
| 5,334,263 A | 8/1994 | Schaeffer | 148/217 |
| 5,856,027 A * | 1/1999 | Murphy | 428/623 |
| 5,981,091 A | 11/1999 | Rickerby et al. | 428/670 |
| 6,682,827 B2 | 1/2004 | Darolia et al. | 428/632 |
| 2004/0229075 A1 | 11/2004 | Gleeson et al. | 428/629 |
| 2006/0127695 A1* | 6/2006 | Gleeson et al. | 428/670 |
| 2006/0210825 A1* | 9/2006 | Gleeson et al. | 428/680 |

FOREIGN PATENT DOCUMENTS

EP    1 321 541 A2 *    6/2003

OTHER PUBLICATIONS

U.S. Appl. No. 10/904,844, filed Dec. 1, 2004, Darolia, et al.
U.S. Appl. No. 10/904,220, filed Oct. 29, 2004, Darolia, et al.
U.S. Appl. No. 10/904,221, filed Oct. 29, 2004, Darolia, et al.
U.S. Appl. No. 10/904,222, filed Oct. 29, 2004, Darolia, et al.

* cited by examiner

*Primary Examiner*—Michael E. LaVilla
(74) *Attorney, Agent, or Firm*—David L. Narciso; Gary M. Hartman; Domenica N. S. Hartman

(57) ABSTRACT

An intermetallic composition suitable for use as an environmentally-protective coating on surfaces of components used in hostile thermal environments, including the turbine, combustor and augmentor sections of a gas turbine engine. The coating contains the gamma-prime ($Ni_3Al$) nickel aluminide intermetallic phase and either the beta (NiAl) nickel aluminide intermetallic phase or the gamma solid solution phase. The coating has an average aluminum content of 14 to 30 atomic percent and an average platinum-group metal content of at least 1 to less than 10 atomic percent, the balance of the coating being nickel, one or more of chromium, silicon, tantalum, and cobalt, optionally one or more of hafnium, yttrium, zirconium, lanthanum, and cerium, and incidental impurities.

20 Claims, 5 Drawing Sheets

GAMMA PRIME PHASE-CONTAINING NICKEL ALUMINIDE COATING

STATEMENT REGARDING FEDERALLY SPONSORED RESEARCH

This invention was made with Government support under Agreement No. N00421-0-C-0035 awarded by U.S. Department of the Navy. The Government has certain rights in the invention.

BACKGROUND OF THE INVENTION

This invention relates to coatings of the type used to protect components exposed to high temperature environments, such as the hostile thermal environment of a gas turbine engine. More particularly, this invention is directed to coatings containing gamma-prime (γ') phase nickel aluminide, either the gamma (γ-Ni) phase or beta (β) phase nickel aluminide, and a limited but effective amount of a platinum-group metal.

Certain components of the turbine, combustor and augmentor sections susceptible to damage by oxidation and hot corrosion attack are typically protected by an environmental coating and optionally a thermal barrier coating (TBC), in which case the environmental coating is termed a bond coat that in combination with the TBC forms what may be termed a TBC system. Because the maximum design temperature of a component is generally limited by the maximum allowable temperature of its environmental coating or bond coat (in the event of TBC spallation), any improvement in temperature capability of an environmental coating or bond coat results in a higher maximum operating temperature (and/or increased durability) for the component.

Environmental coatings and TBC bond coats are often formed of an oxidation-resistant aluminum-containing alloy or intermetallic whose aluminum content provides for the slow growth of a strong adherent continuous aluminum oxide layer (alumina scale) at elevated temperatures. This thermally grown oxide (TGO) provides protection from oxidation and hot corrosion, and in the case of a bond coat promotes a chemical bond with the TBC. However, a thermal expansion mismatch exists between metallic bond coats, their alumina scale and the overlying ceramic TBC, and peeling stresses generated by this mismatch gradually increase over time to the point where TBC spallation can occur as a result of cracks that form at the interface between the bond coat and alumina scale or the interface between the alumina scale and TBC. More particularly, coating system performance and life have been determined to be dependent on factors that include stresses arising from the growth of the TGO on the bond coat, stresses due to the thermal expansion mismatch between the ceramic TBC and the metallic bond coat, the fracture resistance of the TGO interface (affected by segregation of impurities, roughness, oxide type and others), and time-dependent and time-independent plastic deformation of the bond coat that leads to rumpling of the bond coat/TGO interface. As such, advancements in TBC coating system have been concerned in part with delaying the first instance of oxide spallation, which in turn is influenced by the above strength-related factors.

Environmental coatings and TBC bond coats in wide use include alloys such as MCrAlX overlay coatings (where M is iron, cobalt and/or nickel, and X is yttrium or another rare earth element), and diffusion coatings that contain aluminum intermetallics, predominantly beta-phase nickel aluminide and platinum aluminides (PtAl). In contrast to the aforementioned MCrAlX overlay coatings, which are metallic solid solutions containing intermetallic phases, the NiAl beta phase is an intermetallic compound present within nickel-aluminum compositions containing about 25 to about 60 atomic percent aluminum. Because TBC life depends not only on the environmental resistance but also the strength of its bond coat, bond coats capable of exhibiting higher strength have been developed, notable examples of which include beta-phase NiAl overlay coatings (as opposed to diffusion coatings) disclosed in commonly-assigned U.S. Pat. No. 5,975,852 to Nagaraj et al., U.S. Pat. No. 6,153,313 to Rigney et al., U.S. Pat. No. 6,255,001 to Darolia, U.S. Pat. No. 6,291,084 to Darolia et al., U.S. Pat. No. 6,620,524 to Pfaendtner et al., and U.S. Pat. No. 6,682,827 to Darolia et al. These intermetallic overlay coatings, which preferably contain a reactive element (such as zirconium and/or hafnium) and/or other alloying constituents (such as chromium), have been shown to improve the adhesion and spallation resistance of a ceramic TBC. The presence of reactive elements such as zirconium and hafnium in beta-phase NiAl overlay coatings has been shown to improve environmental resistance as well as strengthen the coating, primarily by solid solution strengthening of the beta-phase NiAl matrix. However, if the solubility limits of the reactive elements are exceeded, precipitates of a Heusler phase ($Ni_2AlZr$ (Hf, Ti, Ta)) can form that can drastically lower the oxidation resistance of the coating due to preferential internal oxidation of these precipitates.

The suitability of environmental coatings and TBC bond coats formed of NiAlPt to contain both gamma phase (γ-Ni) and gamma-prime phase (γ'-$Ni_3Al$) is reported in U.S. Patent Application Publication No. 2004/0229075 to Gleeson et al. The NiAlPt compositions evaluated by Gleeson et al. contained less than about 23 atomic percent (about 9 weight percent or less) aluminum, and between about 10 and 30 atomic percent (about 28 to 63 weight percent) platinum. Additions of reactive elements are also contemplated by Gleeson et al. According to Gleeson et al., the compositions were predominantly made up of the gamma and gamma prime phases, with substantially no beta phase. NiAlPt compositions have been shown to be substantially free of the rumpling phenomenon associated with TBC coating failure on PtAl bond coats, and the high levels of platinum in these coatings can result in excellent oxidation performance. Furthermore, the relatively low aluminum content of these NiAlPt compositions reduces and potentially eliminates the formation of topologically close-packed (TCP) phases, which form a particularly detrimental type of diffusion zone known as a secondary reaction zone (SRZ) observed in newer generation high strength superalloys when protected by high aluminum-activity coatings.

Even with the above advancements, there remains a considerable and continuous effort to further increase the service life of environmental coatings and TBC systems.

BRIEF SUMMARY OF THE INVENTION

The present invention generally provides an intermetallic composition suitable for use as an environmentally-protective coating on surfaces of components used in hostile thermal environments, including the turbine, combustor and augmentor sections of a gas turbine engine. The invention is particularly directed to coatings that contain the gamma-prime ($Ni_3Al$) nickel aluminide intermetallic phase and either the beta (NiAl) nickel aluminide intermetallic phase or the gamma solid solution phase. As used herein, the beta and gamma-prime phases employed in the present invention are stable intermetallic compounds of nickel and aluminum, in which the gamma prime-phase exists for NiAl compositions containing nickel and aluminum in an atomic ratio of about 3:1, and the beta-phase nickel aluminide exists for NiAl compositions containing nickel and aluminum in an atomic ratio of about 1:1. Accordingly, the gamma prime phase-containing coating of this invention is compositionally distinguishable from other coating compositions that are predominantly or entirely solid solutions of nickel, aluminum, and other possible constituents.

According to the invention, the coating is used in a coating system deposited on a substrate and, as discussed above, contains the gamma-prime nickel aluminide intermetallic phase and either the beta nickel aluminide intermetallic phase or the gamma solid solution phase. The coating has an average aluminum content of 14 to 30 atomic percent and an average platinum-group metal content of at least 1 atomic percent to less than 10 atomic percent, the balance of the coating being nickel, one or more of chromium, silicon, tantalum, and cobalt, optionally one or more of hafnium, yttrium, zirconium, lanthanum, and cerium, and incidental impurities.

The coating of this invention has desirable environmental and mechanical properties that render it useful as an environmental coating and as a bond coat for a thermal barrier coating (TBC). In particular, the coating has exhibited improved oxidation resistance as compared to prior gamma prime phase-containing coatings, believed to be attributable at least in part to the limited platinum-group metal content of the coating as compared to prior gamma prime phase-containing coatings. The coating achieves this advantage while optionally allowing for the presence of the beta phase, which is believed to exhibit superior oxidation resistance and corrosion resistance while also capable of being strengthened through alloying with reactive elements. Because reactive elements such as hafnium and zirconium have a higher solubility limit in the gamma prime phase than the beta phase, significantly greater amounts of reactive elements can be incorporated into the coating to improve its environmental resistance and strength without undesirably leading to precipitation of reactive element-rich phases that would promote internal oxidation of the coating. Because of this difference in solubility, coatings of the present invention are characterized by a gamma prime phase that tends to have a higher reactive element content than any beta phase present in the coating. The strength of the gamma-prime phase, and its ability to serve as a strengthening phase for any beta and/or gamma phase present, enables coatings of this invention to better inhibit spallation events brought on by stress-related factors.

The gamma-prime content and any gamma content of the coating are also more chemically similar to superalloy compositions on which the coating may be deposited, especially in terms of aluminum content. As a result, there is a reduced tendency for aluminum (and other coating constituents) to diffuse from the coating into the substrate, thereby reducing the likelihood that a deleterious SRZ will form in the superalloy.

Other objects and advantages of this invention will be better appreciated from the following detailed description.

DETAILED DESCRIPTION OF THE INVENTION

Figure 1:
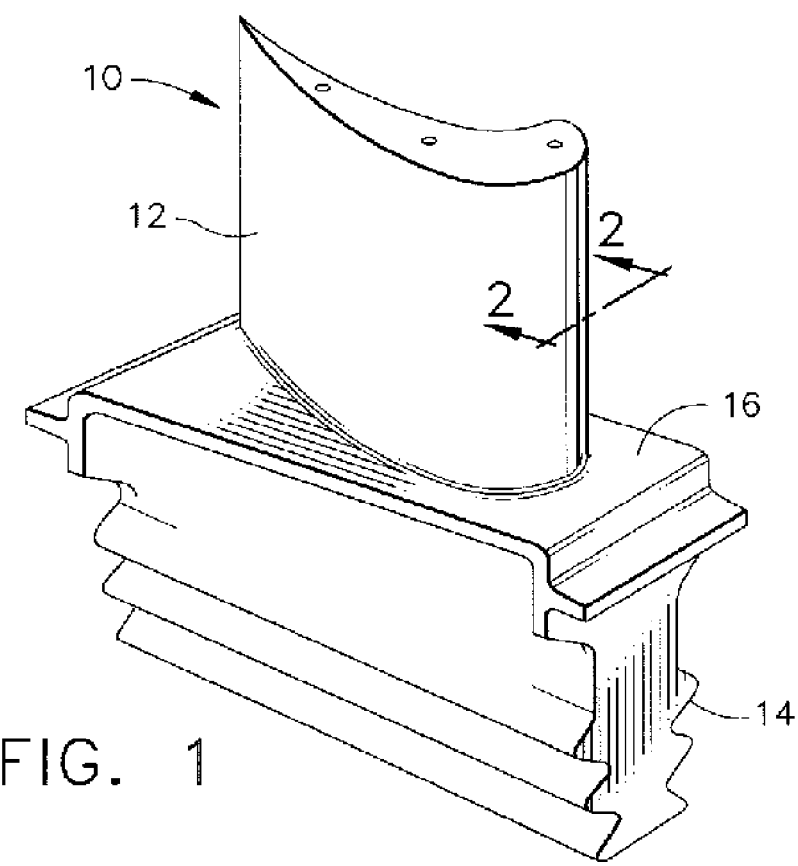
FIG. 1 is a perspective view of a high pressure turbine blade.

The present invention is generally applicable to components that operate within environments characterized by relatively high temperatures, and are therefore subjected to severe thermal stresses and thermal cycling. Notable examples of such components include the high and low pressure turbine nozzles and blades, shrouds, combustor liners and augmentor hardware of gas turbine engines. One such example is the high pressure turbine blade 10 shown in FIG. 1. The blade 10 generally includes an airfoil 12 against which hot combustion gases are directed during operation of the gas turbine engine, and whose surface is therefore subjected to severe attack by oxidation, corrosion and erosion. The airfoil 12 is anchored to a turbine disk (not shown) with a dovetail 14 formed on a root section 16 of the blade 10. While the advantages of this invention will be described with reference to the high pressure turbine blade 10 shown in FIG. 1, the teachings of this invention are generally applicable to any component on which a coating system may be used to protect the component from its environment.

Figure 2:
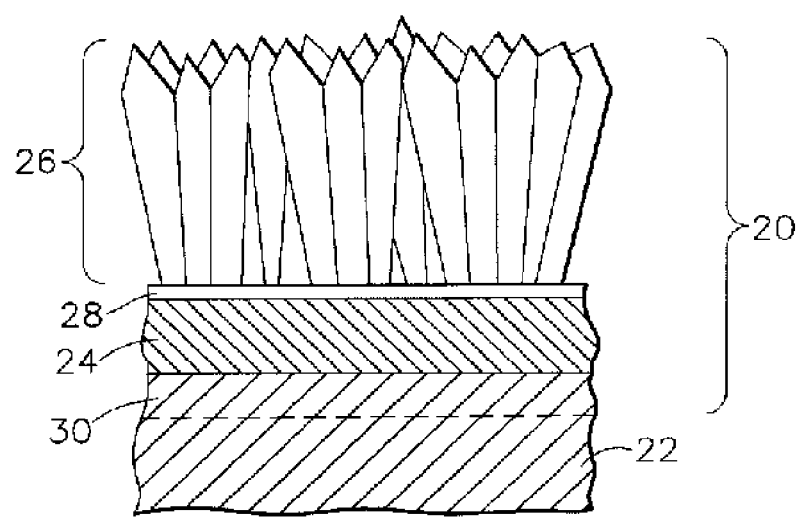
FIG. 2 is a cross-sectional view of the blade of FIG. 1 along line 2--2, and shows a thermal barrier coating system on the blade in accordance with an embodiment of this invention.

Represented in FIG. 2 is a TBC system 20 of a type that benefits from the teachings of this invention. As shown, the coating system 20 includes a ceramic layer, or thermal barrier coating (TBC), 26 bonded to the blade substrate 22 with a metallic coating 24, which therefore serves as a bond coat to the TBC 26. The coating 24 is depicted in FIG. 2 as an overlay coating, though it is believed that the teachings and benefits of this invention also encompass diffusion coatings, as will be discussed below. The substrate 22 (blade 10) is preferably formed of a superalloy, such as a nickel-base superalloy, though it is foreseeable that the substrate 22 could be formed of another material. To attain the strain-tolerant columnar grain structure depicted in FIG. 2, the TBC 26 is preferably deposited by physical vapor deposition (PVD), such as electron beam physical vapor deposition (EBPVD), though other deposition techniques could be used including thermal spray processes.

A preferred material for the TBC 26 is yttria-stabilized zirconia (YSZ), with a suitable composition being about 3 to about 20 weight percent yttria (3 -20%YSZ), though other ceramic materials could be used, such as yttria, nonstabilized zirconia, and zirconia stabilized by other oxides. Notable alternative materials for the TBC 26 include those formulated to have lower coefficients of thermal conductivity (low-k) than 7%YSZ, notable examples of which are disclosed in commonly-assigned U.S. Pat. No. 6,586,115 to Rigney et al., 6,686,060 to Bruce et al., 6,808,799 to Darolia et al., 6.890.668 to Bruce et al., and 7,060,365 to Bruce, and U.S. Pat. No. 6,025,078 to Rickerby. Still other suitable ceramic materials for the TBC 26 include those that resist spallation from contamination by compounds such as CMAS (a eutectic of calcia, magnesia, alumina and silica). For example, the TBC can be formed of a material capable of interacting with molten CMAS to form a compound with a melting temperature that is significantly higher than CMAS, so that the reaction product of CMAS and the material does not melt and infiltrate the TBC. Examples of CMAS-resistant coatings include alumina, alumina-containing YSZ, and hafnia-based ceramics disclosed in commonly-assigned U.S. Pat. Nos. 5,660,885, 5,683,825, 5,871,820, 5,914,189, 6,627,323, 6,720,038, and 6,890,668, whose disclosures regarding CMAS-resistant coating materials are incorporated herein by reference. Other potential ceramic materials for the TBC include those formulated to have erosion and/or impact resistance better than 7%YSZ. Examples of such materials include certain of the above-noted CMAS-resistant materials, particularly alumina as reported in U.S. Pat. No. 5,683,825 and U.S. Pat. No. 6.720.038. Other erosion and impact-resistant compositions include reduced-porosity YSZ as disclosed in commonly-assigned U.S. Pat. No. 6,982,126 and U.S. Patent Application Publication No. 2005/0170200, fully stabilized zirconia (e.g., more than 17%YSZ) as disclosed in commonly-assigned U.S. Patent Application Publication No. 2005/0170200, and chemically-modified zirconia-based ceramics. The TBC 26 is deposited to a thickness that is sufficient to provide the required thermal protection for the underlying substrate 22 and blade 10, generally on the order of about 100 to about 300 micrometers.

As with prior art TBC systems, an important role of the coating 24 is to environmentally protect the substrate 22 when exposed to an oxidizing environment, and to provide a reservoir of aluminum from which an aluminum oxide surface layer (alumina scale) 28 grows to promote adhesion of the TBC 26. According to the invention, the coating 24 is at least predominantly the gamma-prime nickel aluminide ($Ni_3Al$) intermetallic phase (at least 50 volume percent gamma-prime phase, preferably at least 70 volume percent gamma-prime phase), with the balance being predominantly either the beta nickel aluminide (NiAl) phase or the gamma phase. In addition to the nickel and aluminum levels required for the gamma-prime, beta, and gamma phases, the coating 24 further contains limited alloying additions of one or more platinum-group metals, and may also contain other limited alloying additions. According to a preferred aspect of the invention, the coating 24 contains less than 10 atomic percent (less than about 29 weight percent), preferably at least 5 atomic percent (about 17 weight percent), of one or more platinum-group metals (platinum, iridium, rhodium, palladium, ruthenium, etc.), and has an aluminum content of about 14 to about 30 atomic percent (about 6 to about 14 weight percent). As discussed below, the composition of the coating 24 can vary through its thickness, and therefore the ranges stated herein for its constituents are averages through the coating thickness of the coating 24. In any event, according to the NiAlPt system, the composition of the coating 24 is predominantly the gamma prime phase in combination with either the gamma phase or beta phase.

As known in the art, the gamma prime-phase exists for Ni-Al compositions containing nickel and aluminum in an atomic ratio of about 3:1, while beta-phase nickel aluminide exists for NiAl compositions containing nickel and aluminum in an atomic ratio of about 1:1. On the basis of these ratios, the gamma prime-phase is, by weight, about 86.7% nickel and about 13.3% aluminum, and the beta phase is, by weight, about 68.5% nickel and about 31.5% aluminum. To contain the gamma-prime and/or beta intermetallic phases, the coating 24 of this invention should contain nickel and aluminum in an atomic ratio of about 3:1 to about 1:1, while Ni:Al atomic ratios of greater than 3:1 result in the coating 24 containing the gamma-prime intermetallic phase and the gamma solid solution phase. Generally, an aluminum content lower limit of about 26 atomic percent (about 14 weight percent) is preferred if the desire is to obtain both the beta and gamma-prime phases while avoiding the gamma (Ni) phase, and an aluminum content upper limit of about 25 atomic percent (about 13 weight percent) is preferred if the desire is to obtain both the gamma and gamma-prime phases while avoiding the beta phase. Due to aluminum diffusion at the elevated processing temperatures required to produce the coating 24, it is not likely that the coating 24 can be produced to be entirely of the gamma-prime phase. Nevertheless, from the above it can be appreciated that the particular phases and their relative amounts in the coating 24 can be controlled at least in part by the aluminum content of the coating 24. It should be noted that these ranges are made in reference to the tertiary nickel-aluminum-platinum group system, and that the limits of the aluminum content range can vary by several percent points if other alloying elements are present in the coating 24. Furthermore, the diffusion of alloying elements from the substrate 22 (e.g., tantalum, tungsten, molybdenum, chromium, and cobalt) into the coating 24 will introduce additional variation compared with the nickel-aluminum-platinum ternary.

Coatings with the platinum-group metal and aluminum levels within the above-stated ranges have been demonstrated to exhibit oxidation resistance lives of greater than twice that of conventional PtAl coatings, corresponding to an increase in maximum operating temperature of more than 50° F. (about 30° C.). Coatings within the scope of the invention have also exhibited oxidation lives at Mach 1.0 air velocities of about 50% greater or more than similar coatings but containing higher levels of platinum. While not wishing to be held to any particular theory, such an improvement may be attributable at least in part to the lower platinum-group metal content of the present coating 24 and/or the different profile of the platinum-group metal within the coating 24 of this invention. The relatively low aluminum content of the coating 24 and the relatively low aluminum activity due to the presence of the platinum-group metal is also believed to have increased resistance to SRZ formation as compared to relatively high aluminum-activity coatings, such as coatings formed entirely of the beta phase.

Additional oxidation improvements can be achieved with the coating 24 with limited additions of example, silicon, tantalum, and cobalt, and optionally reactive elements such as hafnium, yttrium, zirconium, lanthanum, and cerium, and corrosion improvements can be achieved with limited additions of chromium. Tantalum also has the desirable affect of improving the strength of the gamma prime phase. Particularly contemplated by this invention are silicon contents of about 0.1 to about 5 atomic percent, tantalum contents of about 0.1 to about 5 atomic percent, cobalt contents of about 0.5 to about 20 atomic percent, combined reactive element contents of about 0.01 to about 2 atomic percent, and chromium contents of about 0.5 to about 20 atomic percent. Reactive elements, and particularly hafnium, are particularly desirable alloying additives for the coating 24, in that additions of one or more reactive elements to the coating 24 in a combined amount of at least 0.01 atomic percent promotes the oxidation or environmental resistance and strength of the beta and gamma-prime phases. Improved strength is desirable for reducing the likelihood of TBC spallation-induced bond coat rumpling. The ability to achieve the advantages associated with reactive elements is promoted by the relatively high solubility level of reactive elements in the gamma-prime phase of the coating 24.

Depending on its particular composition, the coating 24 can be deposited using multiple-step deposition process, with or without a subsequent heat treatment. For example, the coating 24 can be produced as an overlay coating by electroplating the platinum-group metal(s) on the surface of the substrate 22, followed by deposition of a layer of the desired NiAl-containing composition (alone or with other alloying additions) by physical vapor deposition (PVD), such as ion plasma deposition. The NiAl-containing composition can also be deposited by such known methods as directed vapor deposition (DVD) (also yielding an overlay coating), or by pack or vapor phase deposition or chemical vapor deposition (CVD) (yielding a diffusion coating). Suitable thicknesses for the individual coating layers deposited in the above manner include, for example, about five to seven micrometers for the platinum-group metal(s) and about 25 to about 45 micrometers for the NiAl-containing layer. An adequate thickness for the coating 24 is about 0.5 mil (about ten micrometers) in order to protect the underlying substrate 22 and provide an adequate supply of aluminum for formation of the alumina scale 28, though thicknesses of up to about 12 mils (about 300 micrometers) are also suitable and thicknesses of up to about 5 mils (about 125 micrometers) are believed to be preferred for turbine blade applications.

Because of the tendency for interdiffusion in processes used to form the coating 24 (evidenced in part by the presence of a diffusion zone 30 beneath the coating 24 in FIG. 2), the coating 24 will likely contain about 5 atomic percent of elements that were not deposited with the intentional coating constituents. Elements such as tantalum, tungsten, rhenium, molybdenum, cobalt, chromium, etc., are often present in superalloy compositions and tend to readily diffuse at the high temperatures often associated with coating processes and encountered by superalloy components. Processes suitable for producing the coating 24 of this invention can be adapted to take advantage of the tendency for interdiffusion between the coating 24 and substrate 22.

The performance benefits afforded by the present invention have been demonstrated with overlay coatings containing nickel, aluminum, platinum, hafnium, and either silicon or chromium in amounts that, when processed in accordance with the invention, yielded the gamma-prime and gamma phases. In a particular series of overlay coatings evaluated, the platinum contents of the coatings were provided by electroplating platinum to a thickness of about 6 micrometers on specimens, after which Ni—Al—Hf—X (where X is Cr or Si) compositions were deposited by PVD (specifically, ion plasma deposition) to a thickness of about 35 micrometers. The targeted nickel, aluminum, platinum and hafnium contents of the coatings was about 62, about 17, about 8, and about 0.6 atomic percent, average respectively. The targeted average chromium and silicon contents of the coatings were about 11 and about 1.2 atomic percent, respectively, of the final coating. Elements that diffused into the coatings from the substrate accounted for the remaining balance (about five atomic percent) of the coating compositions. The as-deposited coatings then underwent a diffusion heat treatment at about 2000° F. (about 1090° C.) for about 2 hours to cause the platinum and Ni—Al—Hf—X composition to interdiffuse with each other. The specimens were formed of the known nickel-base superalloy René N5 (nominal composition of, by weight, 7.5 Co, 7.0 Cr, 6.2 Al, 6.5 Ta, 5.0 W, 3.0 Re, 1.5 Mo, 0.05 C, 0.15 Hf, 0.01 Y, 0.004 B, the balance nickel and incidental impurities).

Figure 3:
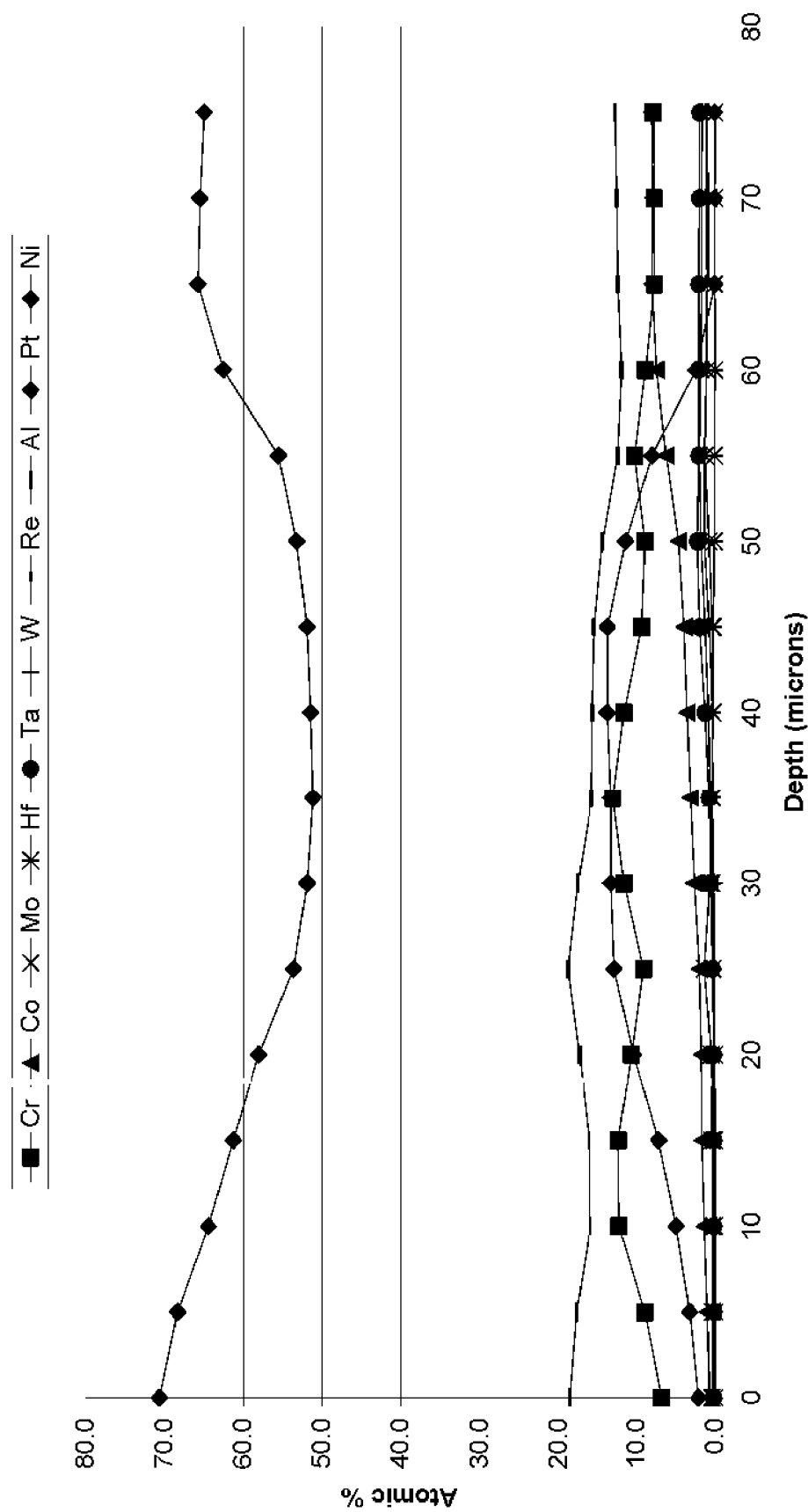
FIG. 3 is a graph depicting the results of a microprobe analysis through a NiAlPtHfCr coating within the scope of this invention.

FIG. 3 is a graph of a microprobe analysis through one of the NiAlPtHfCr coatings, with the original interface located at a depth of about thirty-five micrometers. The coating had an average platinum content of about 8 atomic percent (about 24 weight percent), and a surface platinum content of about 2.1 atomic percent (about 7.5 weight percent). As evident from FIG. 3, the coating had a more uniform aluminum content in the range of about of about 15 to 19 atomic percent (about 5.8 to about 9.0 weight percent), with an average aluminum content of about 17 atomic percent (about 7.2 weight percent). Notably, the aluminum concentration was about 15 atomic percent (about 5.8 weight percent) at the substrate surface, which is less than the aluminum content of many superalloys (such as René N5 at about 6.2 weight percent), which is believed would prevent or at least significantly inhibit the formation of SRZ in an SRZ-prone superalloy.

Figure 4:
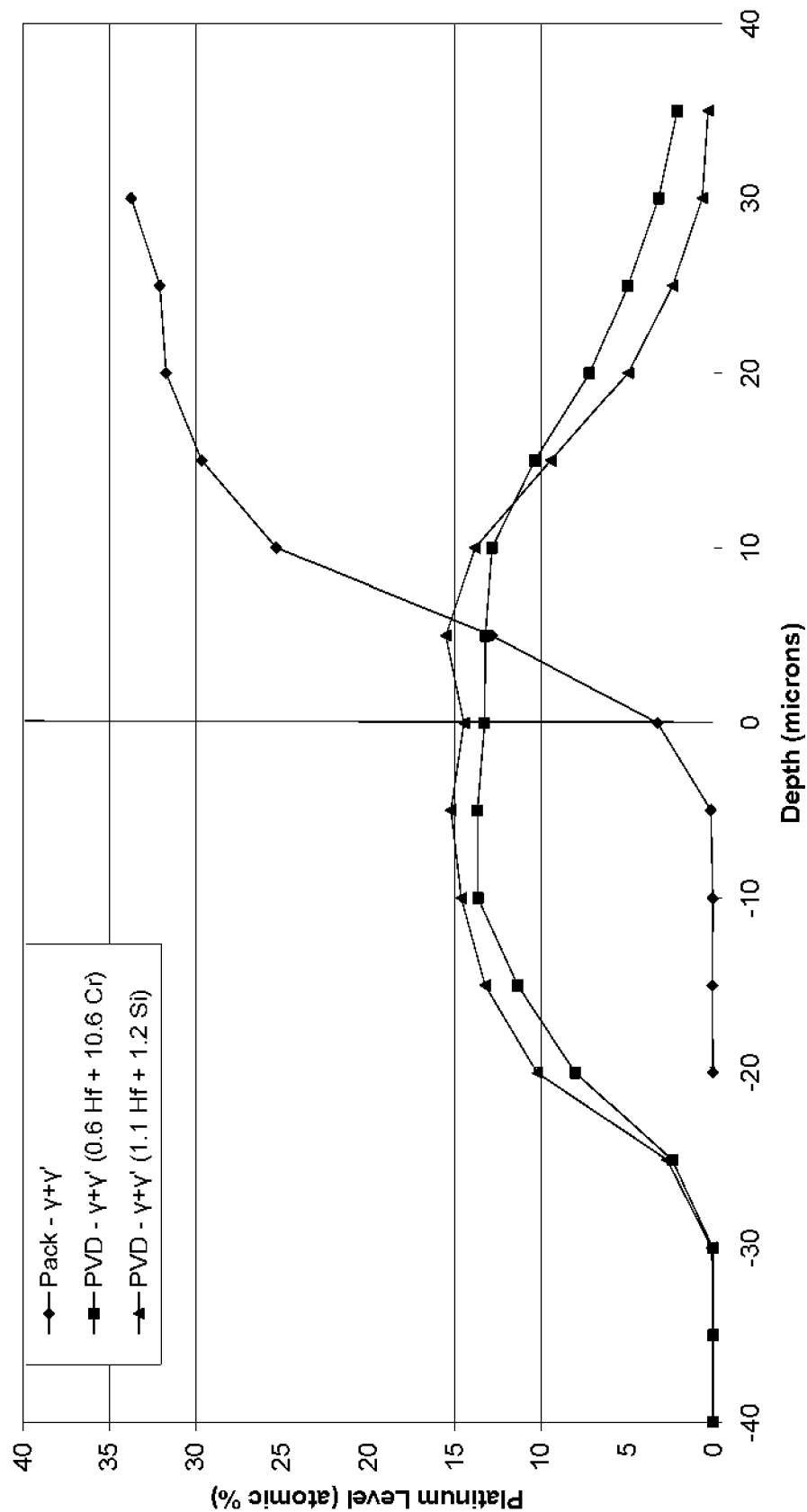
FIG. 4 is a graph depicting the results of a microprobe analysis of platinum contents through NiAlPtHf coatings within the scope of this invention and a NiAlPtHf coating of the prior art.

FIG. 4 is a graph of microprobe data comparing the platinum levels through one each of the Hf+Cr and Hf+Si coatings ("PVD–γ+γ'(0.6 Hf+10.6 Cr)" and "PVD–γ+γ'(1.1 Hf+1.2 Si)," respectively) of this invention, as well as a high-Pt NiAlPtHf coating produced by pack cementation ("Pack–γ+γ'"). The latter specimen contained about 41 atomic percent nickel, about 16 atomic percent aluminum, about 28 atomic percent platinum, and about 0.7 atomic percent hafnium (the balance attributable to elements that diffused from the substrate), and was produced by depositing an approximately 6-micrometer thick layer of platinum by electroplating, and then depositing nickel, aluminum, and hafnium by pack cementation to achieve a final coating thickness of about 30 micrometers. As evident from FIG. 4, the platinum profiles of the coatings of this invention differ drastically from the high-Pt Pack–γ+γ' coating produced by pack cementation. It was noted that the high platinum concentration present at the surface of the Pack–γ+γ' coating would ensure high aluminum activity for formation of a protective alumina scale on the coating surface, but would likely be consumed relatively early in the growth of the scale. Furthermore, such a profile would not provide a reservoir at the coating/substrate interface from which to draw platinum to extend the oxidation life of the coating. In contrast, it can be seen from FIG. 4 that the lower-Pt coatings have platinum profiles that provide platinum reservoirs near the coating/substrate interface, while also providing sufficient platinum near the coating surfaces to enhance the activity of aluminum to form protective alumina scale.

Figure 5:
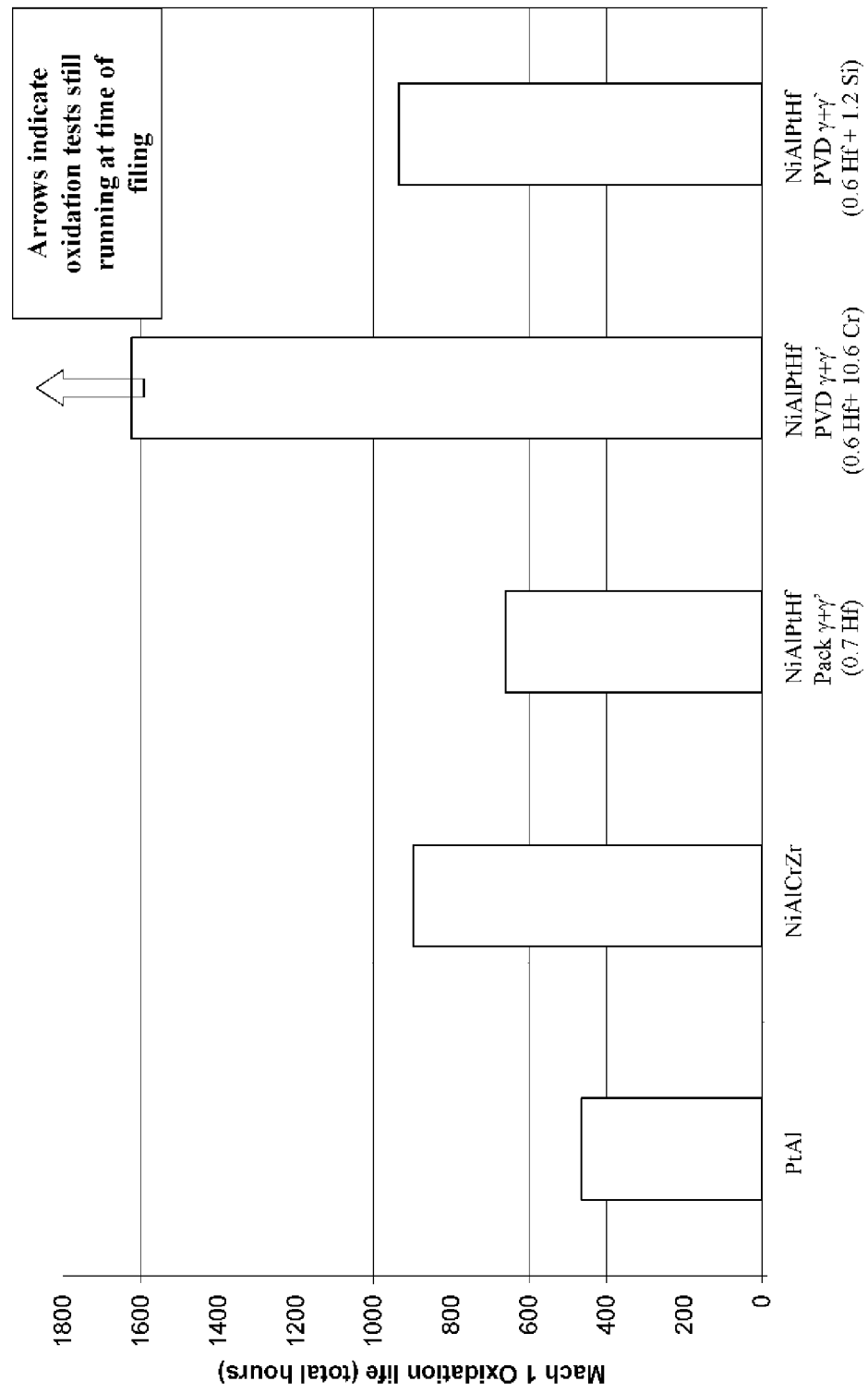
FIGS. 5 and 6 are graphs comparing the Mach 1 oxidation and FCT results, respectively, of NiAlPtHf coatings within the scope of this invention and aluminide-containing coatings of the prior art.

Two coated specimens of each of the three coating compositions underwent oxidation testing conducted in air velocities of about Mach 1.0 and a temperature of about 2150° F. (about 1180° C.). Coating life was judged on the basis of time to breaching of the coating thickness by oxidation. As evidenced by FIG. 5, the average oxidation lives for two specimens of each composition exceeded 1142 hours and about 935 hours for the Hf+Cr and Hf+Si coatings, respectively, as compared to an historical average of about 465 hours for PtAl diffusion coatings (PtAl). At the time of filing these oxidation tests were continuing to run. This approximate 2.5× improvement in oxidation protection translates to an approximately 75° F. (about 40° C.) increase in maximum operating temperature for a component protected by the overlay coating 24 of this invention. The results of this test are charted in FIG. 5 in further comparison with results obtained from the same test with two specimens coated with 1.5 micrometer thick beta-phase NiAlCrZr overlay coatings ("NiAlCrZr") produced in accordance with U.S. Pat. No. 6,291,084, and the two specimens coated with the NiAlPtHf coatings produced by pack cementation (Pack γ+γ'). The coatings of this invention exhibited Mach 1 oxidation lives of more than 50% greater the pack γ+γ' specimens, which was attributed to the relatively lower platinum levels and different platinum profiles of the coatings of this invention.

Figure 6:
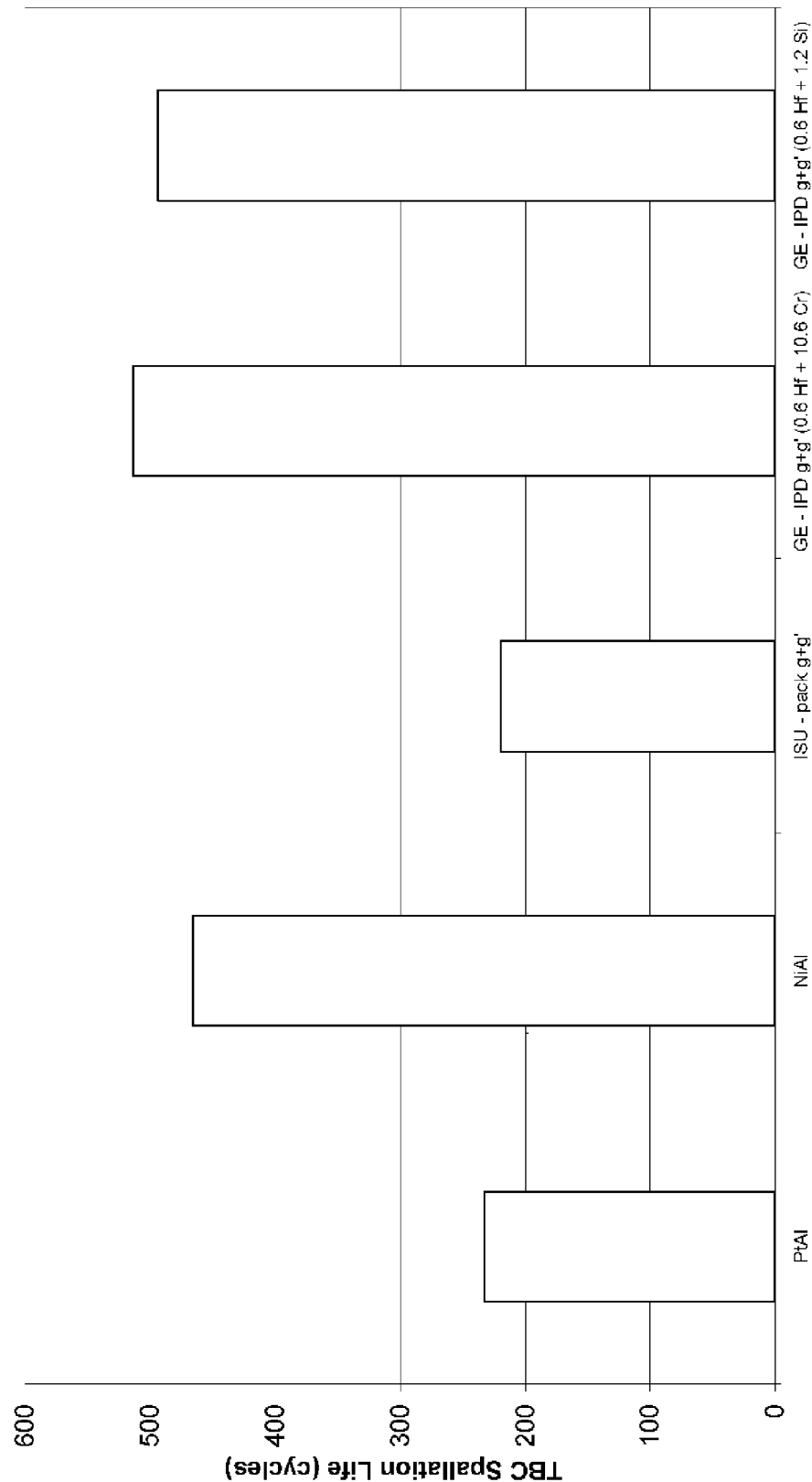

Three additional coated specimens were tested to evaluate the influence of the NiAlPtHfX overlay coatings on TBC life. For this purpose, a 125 micrometer-thick layer of 7 wt % YSZ was deposited on the overlay coating of each specimen using conventional EBPVD processing. The specimens then underwent furnace cycle testing (FCT) with a peak cycle temperature of about 2125° F. (about 1160° C.) and a cycle duration of about one hour. Specimens were removed from test if spallation exceeded 20 percent of the original TBC-coated surface area. As represented in FIG. 6, average spallation lives exceeding 500 and about 493 cycles were achieved for the specimens with the Hf+Cr and Hf+Si contents, respectively. These results demonstrated an approximately 2.1× improvement in TBC spallation life in FCT as compared to an historical average of about 233 cycles for PtAl diffusion coatings, and an approximately 2.2× improvement in TBC spallation life in FCT as compared to the average of about 220 cycles for the Pack γ+γ' coatings.

While the invention has been described in terms of a preferred embodiment, it is apparent that other forms could be adopted by one skilled in the art. Accordingly, the scope of the invention is to be limited only by the following claims.

What is claimed is:

1. A coating system on a substrate, the coating system comprising a coating consisting essentially of gamma prime-$Ni_3Al$ intermetallic phase and either beta-NiAl intermetallic phase or gamma-Ni phase, the coating having an average aluminum content of 14 to 30 atomic percent and an average platinum-group metal content of at least 1 to less than 10 atomic percent, the balance of the coating being nickel, one or more of chromium, silicon, tantalum, and cobalt, optionally one or more of hafnium, yttrium, zirconium, lanthanum, and cerium, and incidental impurities, wherein the coating has an outer surface region with a platinum-group metal content of less than the average platinum-group metal content in the coating.

2. The coating system according to claim 1, wherein the coating consists essentially of the gamma prime-$Ni_3Al$ intermetallic phase and the gamma-Ni phase.

3. The coating system according to claim 1, wherein the coating has an average aluminum content of 14 to 25 atomic percent.

4. The coating system according to claim 1, wherein the coating consists essentially of nickel, aluminum, platinum, chromium, hafnium, and optionally silicon.

5. The coating system according to claim 1, wherein the coating has an innermost region with an aluminum content of less than the average aluminum content in the coating.

6. The coating system according to claim 1, wherein the coating contains at least one of hafnium, yttrium, zirconium, lanthanum, and cerium in a combined amount of about 0.01 to about 2 atomic percent.

7. The coating system according to claim 1, wherein the coating contains 0.01 to about 2 atomic percent hafnium.

8. The coating system according to claim 1, wherein the coating contains about 0.5 to about 20 atomic percent chromium.

9. The coating system according to claim 1, wherein the coating contains up to about 11 atomic percent chromium.

10. The coating system according to claim 1, wherein the coating contains at least one of silicon in an amount of about 0.1 to about 5 atomic percent, tantalum in an amount of about 0.1 to about 5 atomic percent, and cobalt in an amount of about 0.5 to about 20 atomic percent.

11. The coating system according to claim 1, wherein the coating contains up to about 1.2 atomic percent silicon.

12. The coating system according to claim 1, wherein the coating contains at least 50 volume percent of the gamma-prime-$Ni_3Al$ intermetallic phase.

13. The coating system according to claim 1, further comprising a thermal-insulating ceramic layer adhered to the coating.

14. The coating system according to claim 1, wherein the coating is an overlay coating.

15. The coating system according to claim 1, wherein the coating is a diffusion coating.

16. A coating system on a substrate, the coating system comprising a coating consisting essentially of the gamma prime-$Ni_3Al$ intermetallic phase and the beta-NiAl intermetallic phase, the coating having an average aluminum content of 14 to 30 atomic percent and an average platinum-group metal content of at least 1 to less than 10 atomic percent, the balance of the coating being nickel, one or more of chromium, silicon, tantalum, and cobalt, optionally one or more of hafnium, yttrium, zirconium, lanthanum, and cerium, and incidental impurities.

17. A coating system on a substrate, the coating system comprising a coating consisting essentially of gamma prime-$Ni_3Al$ intermetallic phase and either beta-NiAl intermetallic phase or gamma-Ni phase, the coating having an average aluminum content of 26 to 30 atomic percent and an average platinum-group metal content of at least 1 to less than 10 atomic percent, the balance of the coating being nickel, one or more of chromium, silicon, tantalum, and cobalt, optionally one or more of hafnium, yttrium, zirconium, lanthanum, and cerium, and incidental impurities.

18. A coating system on a substrate, the coating system comprising a coating consisting essentially of gamma prime-$NI_3Al$ intermetallic phase and either beta-NiAl intermetallic phase or gamma-Ni phase, the coating having an average aluminum content of 14 to 30 atomic percent and an average platinum-group metal content of at least 1 to less than 10 atomic percent, about 0.1 to about 5 atomic percent tantalum, the balance of the coating being nickel, one or more of chromium, silicon, and cobalt, optionally one or more of hafnium, yttrium, zirconium, lanthanum, and cerium, and incidental impurities.

19. A coating system on a substrate, the coating system comprising a coating consisting essentially of gamma prime-$Ni_3Al$ intermetallic phase and either beta-NiAl intermetallic phase or gamma-Ni phase, the coating having an average aluminum content of 14 to 30 atomic percent and an average platinum-group metal content of at least 1 to less than 10 atomic percent, about 0.5 to about 20 atomic percent cobalt, the balance of the coating being nickel, one or more of chromium, silicon, and tantalum, optionally one or more of hafnium, yttrium, zirconium, lanthanum, and cerium, and incidental impurities.

20. A coating system on a superalloy substrate of a gas turbine engine component, the coating system comprising an overlay coating consisting essentially of gamma prime-$Ni_3Al$ intermetallic phase and either beta-NiAl intermetallic phase or gamma-Ni phase, the overlay coating having an average aluminum content of 14 to 30 atomic percent and an average platinum-group metal content of at least 1 to less than 10 atomic percent, 0.01 to about 2 atomic percent hafnium, the balance of the overlay coating being nickel, and either chromium or silicon, and incidental impurities, the overlay coating containing at least 50 volume percent of the gamma-prime-$Ni_3Al$ intermetallic phase, the coating having an outer surface region with a platinum-group metal content of less than the average platinum-group metal content in the coating.

* * * * *